United States Patent [19]

Arvidsson

[11] Patent Number: 4,993,615
[45] Date of Patent: Feb. 19, 1991

[54] ANCHORAGE DEVICE

[75] Inventor: Jan-Ivar Arvidsson, Hillerstorp, Sweden

[73] Assignee: Industri AB Thule, Hillerstorp, Sweden

[21] Appl. No.: 188,218

[22] Filed: Apr. 29, 1988

[51] Int. Cl.⁵ .......................... B60R 9/00; B60R 9/04
[52] U.S. Cl. .................................. 224/309; 224/315; 224/329
[58] Field of Search ............... 224/331, 329, 326, 315, 224/330, 320, 322, 323, 309, 325, 327

[56] References Cited

U.S. PATENT DOCUMENTS

| 3,984,038 | 10/1976 | Binding et al. | 224/331 |
| 4,432,479 | 2/1984 | Graber | 224/331 |
| 4,627,559 | 12/1986 | Anderson | 224/322 |
| 4,778,092 | 10/1988 | Grace | 224/331 |
| 4,858,803 | 8/1989 | Geiber | 224/329 |

FOREIGN PATENT DOCUMENTS

| 2933718 | 3/1981 | Fed. Rep. of Germany | 224/329 |
| 3032099 | 4/1982 | Fed. Rep. of Germany | 224/329 |
| 3614740 | 11/1987 | Fed. Rep. of Germany | . |
| 57-17233 | 3/1982 | Japan | . |

OTHER PUBLICATIONS

Audi NSU Auto Union, 2/20/81, see FIGS. 1 and 2, EP 0037456.

Primary Examiner—Henry J. Recla
Assistant Examiner—Keith Kupferschmid
Attorney, Agent, or Firm—Burns, Doane, Swecker & Mathis

[57] ABSTRACT

An anchorage device for a load carrier intended for a vehicle roof (3) includes a strut (1) which extends across the vehicle roof (3) and has, in each end, an anchorage foot (2). The anchorage foot is provided with a support arrangement (4) for transferring loading to the vehicle roof, and also with anchorage members for fixedly retaining the anchorage foot (2) to the vehicle. According to the invention, the support arrangement is provided with two support members (17) which are pivotally retained in the anchorage foot (2) so as to pivot towards and away from one another, and have obliquely inclined grooves (22) for locking accommodation of projections or pins (14) secured in the vehicle. The support members are of platelike configuration so as to be able to extend down into narrow spaces (9, 10, 12) in the vehicle and there engage with the projections or pins (14) and are provided, in their lower edges, with support surfaces (16) for abutment against the bottom (10) of the space (9, 10, 12).

20 Claims, 4 Drawing Sheets

ANCHORAGE DEVICE

TECHNICAL FIELD

The present invention relates to an anchorage device for a load carrier intended for a vehicle roof and comprising a load-bearing unit extending over the vehicle roof and being intended for carrying a load, the load-bearing unit being provided with a foot arrangement at its end, the foot arrangement being provided with a support arrangement which is designed to abut against the vehicle roof and to transfer to the roof a loading generated by the load, and with an anchorage member which is designed for engagement with the vehicle, for fixedly retaining the foot arrangement thereon.

BACKGROUND ART

For many years, vehicles have, almost without exception, been provided with a gutter running along the edges of the vehicle roof which has proved eminently suitable for the anchorage of a roof-rack, load carrier and similar equipment which is to be secured on the vehicle roof. However, modern vehicles, in which streamlining has been pursued to the extreme, often lack these gutters or drip trays, with the result that traditional mounting of a roof-rack, load carrier etc. can no longer be carried out.

On certain types of modern vehicles without roof gutters, special anchorages have been developed for roof-racks, load carriers etc., these being provided with a support plate with a profiled rubber insert which closely follows the configuration of the side edge portion of the roof. For fixedly clamping this support plate, use is then made of a catch which grasps about the roof edge along the upper side of the door opening of the vehicle.

In certain types of vehicles, such anchorage is not possible, since the sealing strip which is intended to seal between the vehicle door and the vehicle body is placed immediately above the door opening and is often secured in a panel projecting laterally from the vehicle and forming a "shelf" above the door opening. As a rule, the above-mentioned sealing strip is normally placed on the upper side of this "shelf" thereby effectively preventing the employment of a catch which extends in and grasps about the edge of the door opening.

A further factor which severely impedes the securement of a roof-rack, a load carrier or similar accessories on a vehicle provided with the above-discussed placement of the sealing strip is that the vehicle door closely approaches the roof edge such that the space between the vehicle door and the closely adjacent roof edge is extremely restricted when the vehicle door is closed. In addition, the space is as good as completely filled-out by the sealing strip which is compressed by the vehicle door on closure.

OBJECTS OF THE PRESENT INVENTION

The present invention has for its object to realize an anchorage device of the type disclosed by way of introduction, this anchorage device being designed in such a manner as to enable it to reliably and efficiently secure a roof-rack, a load carrier or similar accessory on a vehicle which has the above-described design of the door's sealing against the vehicle body. A further object of the present invention is to realize an anchorage device which, by a simple manoeuvre, may rapidly and readily be mounted on and dismounted from the vehicle.

SOLUTION

The objects of the present invention will be attained if the anchorage device intimated by way of introduction is characterized in that the support arrangement is movably connected to the foot arrangement and in addition is designed as an anchorage member.

As a result, a considerable advantage will be afforded that the support arrangement may penetrate into, and secure the foot arrangement in, the narrow slot-shaped space remaining between the rubber strip compressed by the vehicle door and the closely adjacent portion of the vehicle roof.

According to one preferred embodiment of the present invention, the support arrangement is approximately plate-like in configuration in order to extend, with a lower portion, down into a recess disposed in the longitudinal direction of the vehicle, the support arrangement being also provided, at this lower edge portion, with support surfaces for abutment against the vehicle.

As a result of these constructional features, the entire foot arrangement may be carried by the shelf which, as a rule, is disposed above the door opening and which serves as an anchorage means for the sealing strip of the vehicle door. Hence, any separate part of the support arrangement for abutment against the vehicle roof at other regions thereof will become superfluous.

According to the present invention, it suitably further applies that the support arrangement includes two support members which are movable towards and away from one another in the longitudinal direction of the vehicle, these support members having the support surfaces as lower defining edge surfaces, and that the anchorage members are, under the action of the movements of the support members, movable towards and away from their positions in engagement with the vehicle and fixedly retaining the foot arrangement.

This embodiment of the present invention is further suitably characterized in that the anchorage members are designed as recesses disposed in trailing or leading edges of the support arrangement, the recesses being movable to positions for locking accommodation of projections secured in the vehicle and oriented transversely of the longitudinal direction thereof.

Finally, it further suitably applies according to the present invention that the recesses are provided with clamping surfaces which, on movements of the support arrangement, are operative to clamp the support arrangement in abutment against the vehicle.

BRIEF DESCRIPTION OF THE ACCOMPANYING DRAWINGS

The nature of the present invention and its aspects will be more readily understood from the following brief description of the accompanying Drawings, and discussion relating thereto.

DESCRIPTION OF PREFERRED EMBODIMENT

Figure 1:
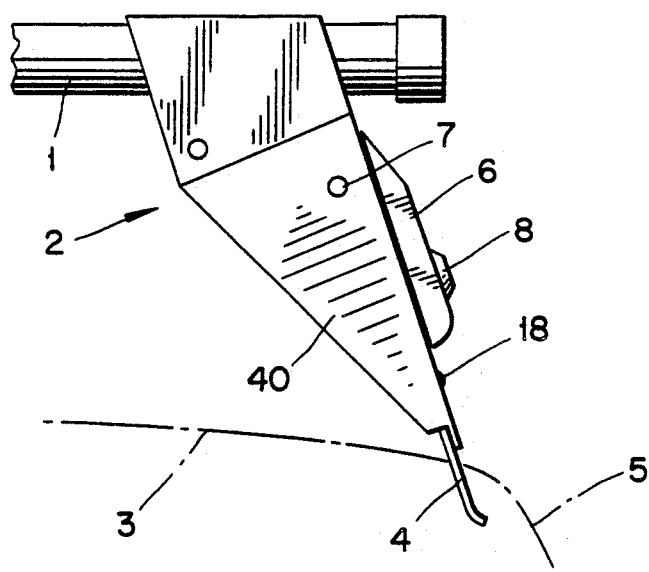
FIG. 1 shows a foot arrangement included in the anchorage device, and the contour line of the vehicle roof, seen in the longitudinal direction of the vehicle.

Referring to the Drawings, FIG. 1 shows, seen from the rear in the longitudinal direction of the vehicle, the right-hand portion of a so-called load carrier which has a load-bearing unit 1 designed as a strut which extends across the vehicle roof and which—directly or indirectly—serves to support the load which is to be placed on the vehicle roof. At its end, the strut 1 is provided with a foot arrangement 2 which is fixedly retained to the strut by suitable means. In FIG. 1, the vehicle roof is intimated by broken lines 3 and it will be apparent from the Figure that the foot arrangement 2 is provided with a support arrangement 4 which extends down beneath the contour of the vehicle roof and inside the contour of the vehicle door 5, respectively.

For its operation, the foot arrangement is provided on its outside with an operating arm 6 which is pivotal about a shaft 7 in a manner to be described in greater detail below, and which, by means of a lock 8, may be fixedly locked in the position shown on the Figure, in which the foot arrangement 2 is, in its entirety, also fixedly locked to the vehicle.

Figure 2:
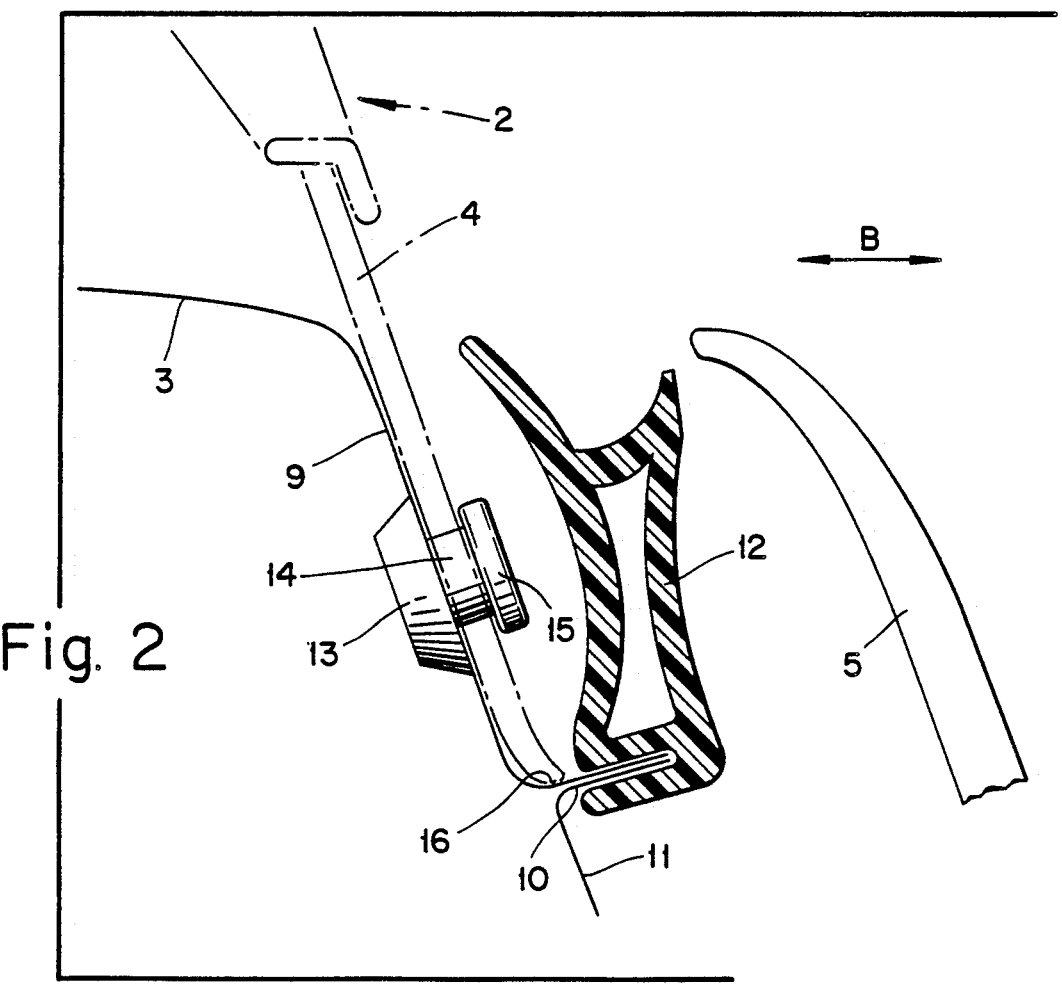
FIG. 2 shows the lower region of the anchorage device of FIG. 1 on a larger scale, this Figure particularly illustrating the cooperation with the vehicle roof and the placements of sealing strip and the vehicle door.

FIG. 2 shows, on a larger scale, the cooperation between the support arrangement 4 and the vehicle roof and door, respectively, and also shows the detailed design of the transitional region which exists between the vehicle roof and the door opening. It will be apparent from the Drawing that the vehicle roof 3 has a downwardly angled portion 9 which, at its lower end, is outwardly flared such that a "shelf" 10 is formed. As a rule, the sheet material in the shelf 10 is dual layered and the shelf 10 in actual fact constitutes a welding joint between that sheet panel which forms the vehicle roof and that panel 11 which defines the door opening of the vehicle. The shelf 10 also suitably serves for the fixed retention of a sealing strip 12 which, on closure of the door 5 according to the double-headed arrow B, will be compressed between the downwardly angled portion 9 and the inside of the door 5 such that a tight seal is obtained between the door and the vehicle roof. The tight connection between the door and the vehicle roof is illustrated in FIG. 1, in that the line which illustrates the vehicle roof 3 and the door 5 is drawn continuously.

In the downwardly angled portion 9, there are fixedly disposed rigidifications or anchorages 13 which serve to retain projections 14 on the outside of the downwardly angled portion. The projections 14 may be in the form of a round plug screwed into the anchorage 13, the plug having, at its free end slightly spaced from the downwardly angled portion 9, a head 15 which will be described in greater detail below.

It will further be apparent from FIG. 2 that the support arrangement 4 forms, with a lower edge portion, a support surface 16 which abuts against the upper side of the shelf 10 and which thereby transfers thereto, via the foot arrangement 2, the loading generated by a load resting on the load-bearing unit 1. It will further be in part apparent from FIG. 2 that the support arrangement 4 is in engagement with the projection 14 so as to be prevented, by the head 15, from moving in the longitudinal direction of the projection, i.e. away from the downwardly angled portion 9.

By being substantially plate-like in configuration (for example of sheet material which is of a relatively great extent at right angles to the plane of the Drawing in FIG. 2), the support arrangement 4 will readily be able to extend down into the space or slot formed between the sealing strip and the downwardly angled portion 9 even when the door 5 is closed and the sealing strip 12 is urged against the downwardly angled portion 9 and against the support arrangement 4.

In purely general terms, the support arrangement 4 could correspondingly extend down into a very narrow longitudinal slot or space disposed in an edge portion along a vehicle roof. If counterparts to the projections 14 are placed in such a space, the subject matter of the present invention may, naturally, also be employed unmodified on such a vehicle.

Figure 3:
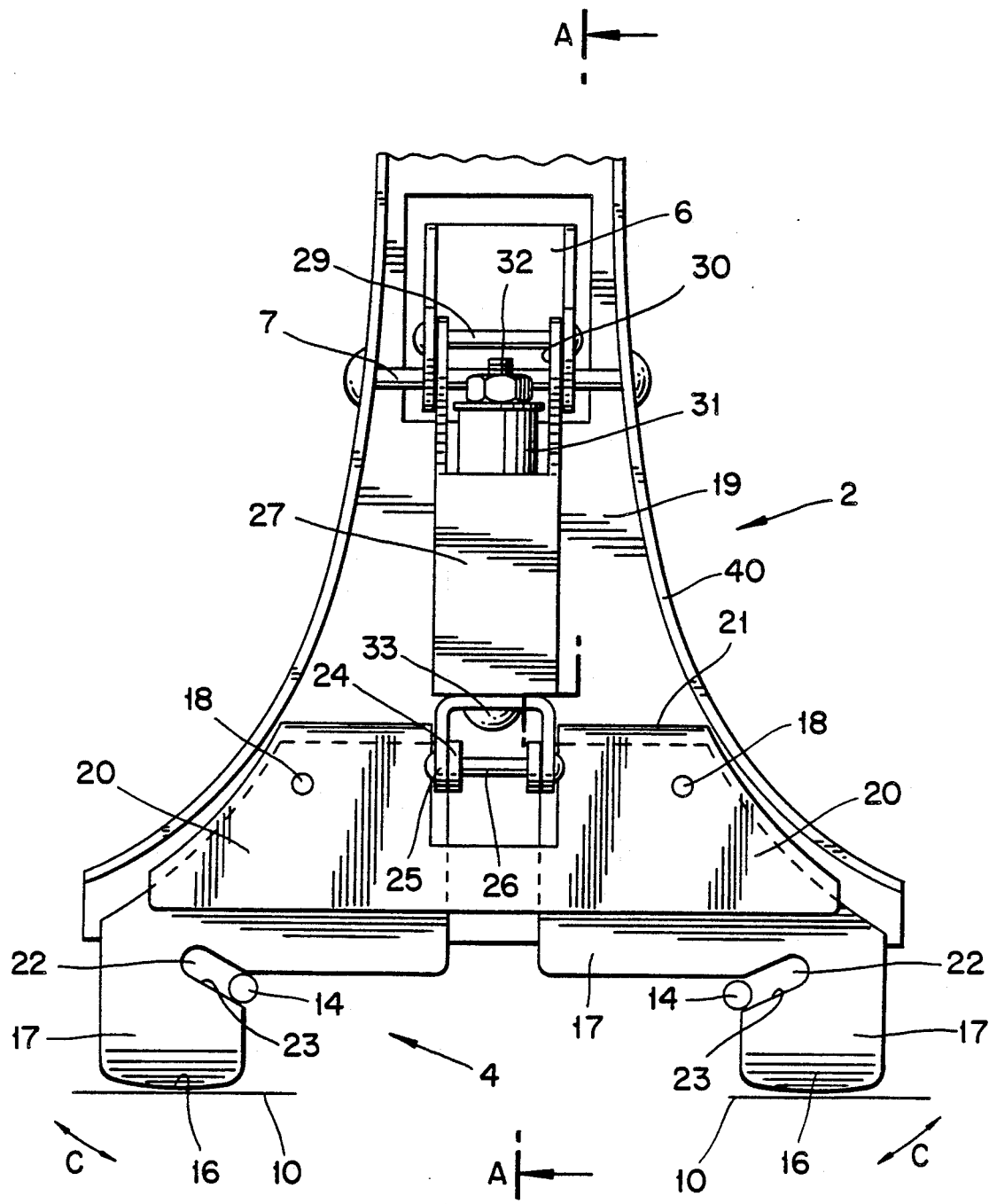
FIG. 3 shows the anchorage device of FIG. 1, viewed from the inside, i.e. from the centre line of the vehicle roof out towards its edge.

It will be apparent from FIG. 3 that the support arrangement 4 includes two support members 17 which are approximately planar and plate-like in configuration and which, by means of shafts 18, are movably (more precisely pivotally) anchored in the foot arrangement 2, such that the support members 17 may pivot reciprocally in accordance with the double-headed arrows C. The support members 17 are guided in the foot arrangement 2 by being accommodated between the dorsal surface 19 of the foot arrangement 2 and a guide portion 20 disposed in parallel therewith.

Figure 4:
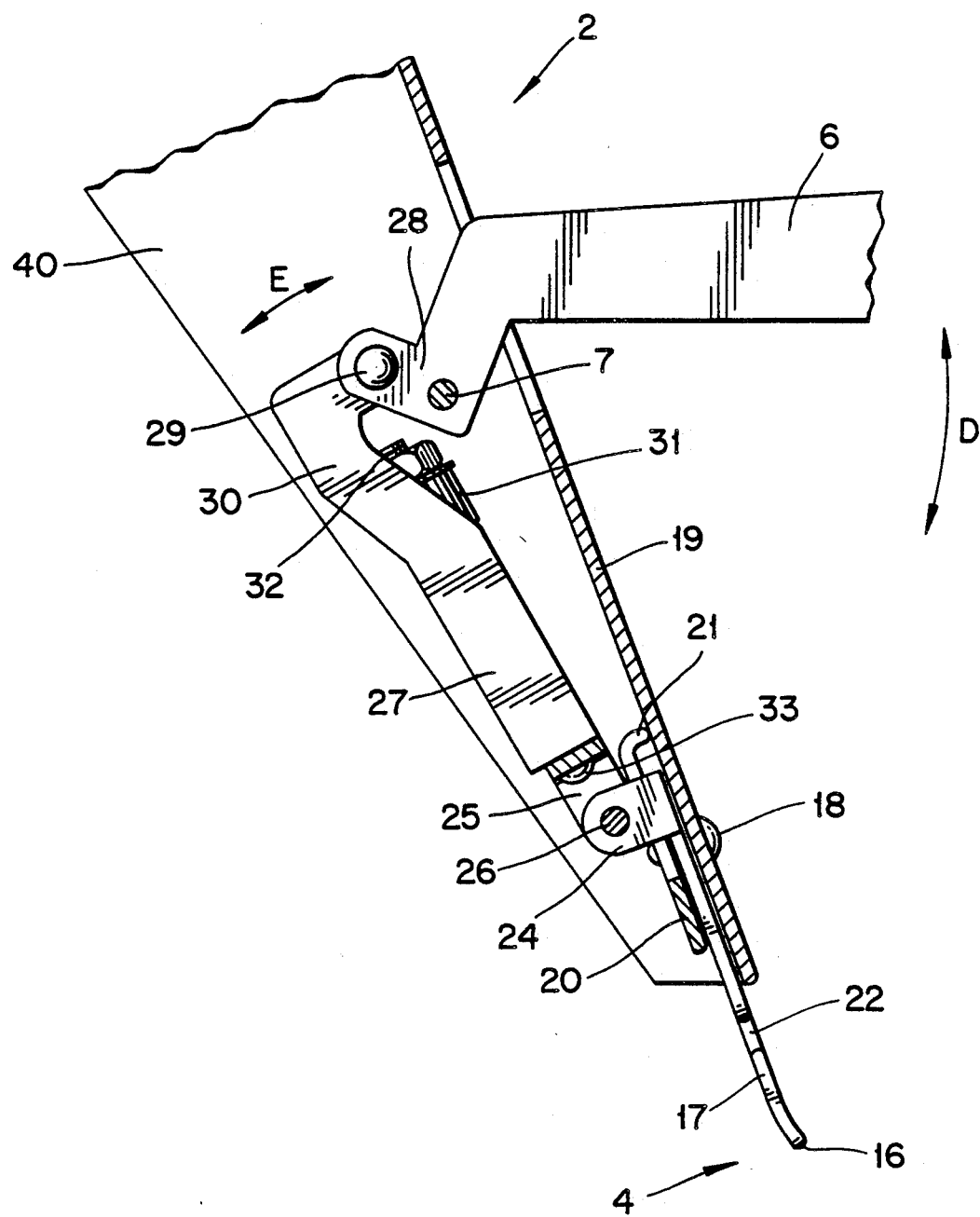
FIG. 4 is a section taken along the broken line A—A in FIG. 3.

It will be apparent from FIG. 4 that the guide portion 20 runs parallel to the dorsal surface 19 and is fixedly retained thereat by means of the shafts 18 in the form of rivets. The guide portion 20 is provided, at least at its upper edge, with an inwardly bent portion 21 which directly abuts against the dorsal surface, but, if stability and strength requirements so demand, the guide portion 20 may also be provided with corresponding inwardly bent portions along its side edges, i.e. along its edges facing the front and rear ends of the vehicle.

FIG. 3 also illustrates the relative position between the support members 17 and the projections 14 when the support arrangement 4 is located in an approximately intermediate position between being locked in the vehicle and being freely disengaged from the vehicle. It will further be apparent that the support members 17 are provided with obliquely directed grooves 22 which serve the purpose of engagement means for fixedly locking cooperation with the projections or pins 14. The lower edges of the grooves 22 constitute clamping surfaces 23 which are obliquely inclined in relation to the slightly arched—or almost fully straight—lower support surfaces 16 of the support members 17. As a result, when the support members 17 are drawn towards one another, i.e. are pivoted about their respective shafts 18, the clamping surfaces 23 will come into cooperation with the projections or pins 14 in such a manner that the foot arrangement 2, and thereby the support arrangement 4, will be urged in a downward direction towards the shelf 10 (see FIG. 2), so that, hereby, the support surfaces 16 are brought into secure and reliable abutment against the shelf.

Contrarily, when both of the support members 17 are pivoted away from one another, the support surfaces 16 will be relieved of loading and will finally be released from the shelf 10 such that, when the pivoting movement has proceeded a slightly greater distance than is apparent from FIG. 3, the entire foot arrangement 2 may thereby be lifted off the vehicle.

In order to achieve the above-described pivotal movement of the two support members 17, these are provided with projecting lugs 24 which, by the intermediary of a yoke 25 and a shaft 26, respectively, are connected to a linkage 27 in an elbow-joint locking mechanism. The elbow-joint locking mechanism also includes the operating arm 6 which is pivotal about the shaft 7 and is provided with an angled arm 28 which, by the intermediary of a shaft 29, is pivotally connected to upper shanks 30 on the linkage 27.

On pivoting of the operating arm 6 according to the double-headed arrow D, where the operating arm may be seen as included in an operating or locking mechanism for the two support members 17, the linkage 27 will be pivoted according to the double-headed arrow E. In this context, it should be mentioned that the linkage and details connected therewith may also be considered as forming part of the operating or locking mechanism. A clockwise pivoting of the operating arm 6 will have as a result that the linkage 27 is pivoted with its upper end in a direction to the right in FIG. 4, while, naturally, a pivoting of the operating arm 6 in the opposite direction will have as a consequence a displacement of the upper end of the linkage 27 to the left in FIG. 4, whereafter the entire linkage 27 is then urged downwardly in both FIG. 3 and FIG. 4. This vertical downward movement of the linkage 27 will have as a result that both of the support members 17 will be pivoted away from one another while, naturally, an upward drawing of the linkage 27 will have as a result that both of the support members 17 are pivoted towards one another into locking engagement with both of the projections or pins 14.

The operating or locking mechanism also includes a resilient element 31 which, on locking of the two support members 17, will be compressed such that suitable tensioning is attained. The resilient element 31 may be designed as a helical spring, a block of resiliently yieldable material or the like, a screw or tension rod 32 being passed through the resilient element 31 and the linkage 27, the tension rod cooperating, with its lower end 33, with the yoke 25.

DESCRIPTION OF ALTERNATIVE EMBODIMENT

Figure 5:
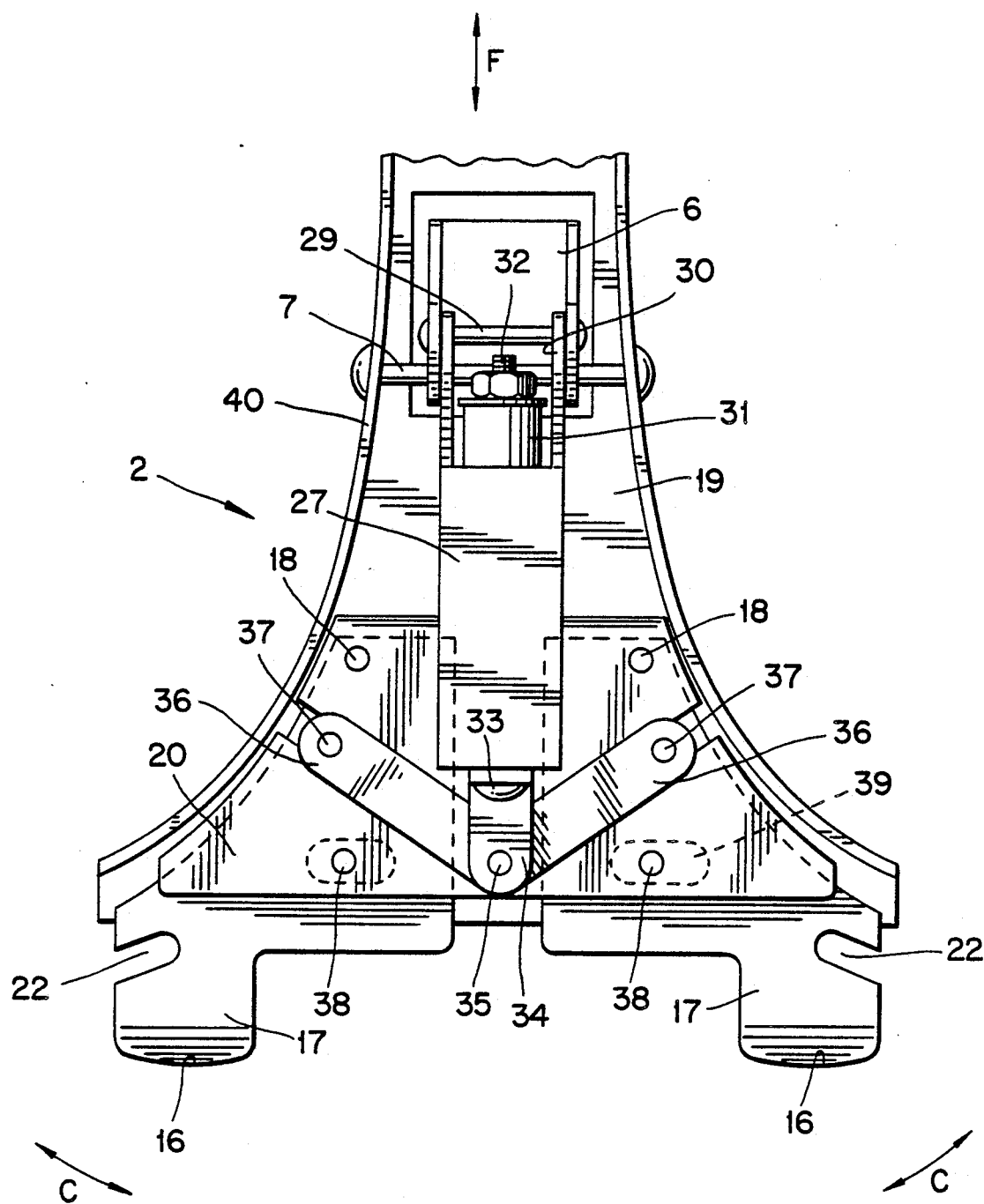
FIG. 5 is a view corresponding to that of FIG. 3 of a modified embodiment of the device according to the invention.

FIG. 5 shows an alternative embodiment of the device according to the present invention which is fundamentally very similar to the embodiment according to FIGS. 3 and 4, but which, however, differs from that embodiment primarily in that both of the obliquely inclined grooves 22 are placed on the outside of the two support members 17 instead of on their insides. The design and oblique inclination of the two grooves 22 correspond fully to that described above and, naturally, both of these inclined grooves are provided with clamping surfaces 23 for fixedly locking cooperation with the projections or pins 14.

In the embodiment according to FIG. 5, the two support members 17 are shifted or pivoted away from one another in the locking operation. This is achieved in that the linkage 27 is, analogous to that described above, movable in a vertical direction according to the double-headed arrow F. The lower end of the linkage 27 is coupled to an angle piece 34 which, by means of a joint 35, is connected to two pressure rods 36 whose upper, outer ends are connected, by the intermediary of joints 37, to both of the support members 17.

As will be apparent from the Drawing Figure, the two pressure rods 36 make a quite considerable angle with one another when the support arrangement 4 is located at a position approximately midway between the open and locked positions. On downwardly directed movement of the linkage 27, the angle between the two pressure rods 36 will become more acute, with the result that both of the support members 17 will be drawn towards one another, while an opposite direction of movement of the support members will be achieved when the linkage 27 is raised.

This embodiment also suitably employs a resiliently yieldable tensioning element (not shown) which may be coupled to the linkage 27 and the angle piece 34 by means of a screw provided with the head 33.

It will further be apparent from FIG. 5 that rivets 38 may be secured in the lower region of the guide portion 20, the rivets extending through elongate apertures 39 in both of the support members 17. The rivets 38 connect the guide portion 20 with the dorsal surface 19 and maintain these at a determined distance from one another in that a suitable spacer is placed about the rivets 38. The employment of these rivets 38 will give increased stability and improved guiding of both of the support members 17—which, in certain cases, may be of crucial importance.

In analogy with that described with particular reference to FIG. 5, the embodiment according to FIGS. 3 and 4 may, of course, also employ the rivets 38 and spacers.

In the embodiment according to FIG. 5, the shafts 18 for the support members 17 could also be moved as close together as possible, with the eventual outcome that one and the same shaft may be employed for both of the support members. If, in this disposition of the shafts 18, the linkage 27 is instead connected to the support members 17 outside the shafts or shaft 18, for example by the intermediary of a rigid crossbar, the same pivotal pattern will be achieved for the support members 17.

In the embodiment according to FIGS. 3 and 4, it is, of course, also possible to wholly dispense with the elbow-joint locking and instead quite simply employ a screw which maneuvers the yoke 25 upwardly and downwardly for tightening and loosening, respectively, of the two support members. This screw may be accessible from the outside of the foot arrangement through a suitable aperture and the head of the screw may suitably abut against a lug which projects outwardly on the outside of the dorsal surface 19, i.e. in the same direction as the operating arm 6 in FIG. 4. To prevent access to this screw, use may be made of a protective hood with approximately the same design and anchorage as the operating arm proper.

As an alternative to the vertically directed screw, it is also, naturally, possible to achieve a pivoting of the two support members 17 by anchoring, in these support members, nuts of opposing turn and then providing a longitudinal screw (approximately parallel to the longitudinal direction of the vehicle) which is accessible or extends through at least the one side surface 40 of the foot arrangement.

The present invention should not be considered as restricted to that described above and shown on the Drawings, many modifications being conceivable without departing from the spirit and scope of the appended Claims.

I claim:

1. An anchorage device for a load carrier intended to be mounted on a vehicle roof, comprising:
   load bearing means for extending over the vehicle roof and for carrying a load;
   foot means provided at opposite end portions of the load bearing means for fastening the load bearing means to the vehicle;
   a plate-like support arrangement movably connected at the end of each foot means, said support arrangement including a lower portion having support surfaces for abutting against the vehicle roof and for transferring thereto a loading generated by said load carrier;
   each of said support arrangements including two support members, said support members being movable towards and away from one another in the longitudinal direction of the vehicle and having the support surfaces as lower edge surfaces;
   said support arrangements including anchorage means for engaging with a portion of the vehicle for fixedly retaining the foot means thereon; and
   operating means mechanically coupled to the support members of a supporting arrangement for moving said supporting members toward and away from one another, said operating means being mounted for pivotal movement in a plane different from a plane in which said support members move.

2. An anchorage device for a load carrier intended to be mounted on a vehicle roof, comprising:
   load bearing means for extending over the vehicle roof and for carrying a load;
   foot means provided at opposite end portions of the load bearing means for fastening the load bearing means to the vehicle;
   a plate-like support arrangement movably connected at the end of each foot means, said support arrangement including a lower portion having support surfaces for abutting against the vehicle roof and for transferring thereto a loading generated by said load carrier;
   each of said support arrangements including two support members, said support members having side and lower edge surfaces and being movable towards and away from one another in the longitudinal direction of the vehicle and having the support surfaces as the lower edge surfaces;
   said support members in each support arrangement including anchorage means for engaging with a portion of the vehicle for fixedly retaining the foot means thereon;
   said anchorage means including recesses disposed in one of said side edge surfaces of the support members; and
   means for pivotally mounting each of said support members of a support arrangement to said foot means, the means for pivotally mounting one of the support members of a support arrangement being spaced in a plane of movement of said support members from the means for pivotally mounting the other support member of the support arrangement.

3. The anchorage device of claim 2, including a guide member rigidly connected to said foot means by said means for pivotally connecting the support members to the foot means.

4. An anchorage device for a load carrier to be mounted on a vehicle roof, comprising:
   load bearing means extending over the vehicle roof for carrying a load;
   foot means provided at opposite end portions of the load bearing means for fastening the load bearing means to the vehicle;
   two plate-like support members pivotally connected to each foot means, said support members having vehicle abutting support surfaces at their lower edges;
   anchorage means provided on each foot means for retaining the foot means on the vehicle; and
   means for operating the anchorage device, said operating means including a lever connected to said plate-like support members for concurrently pivoting said support members about respective axes so as to pivot the anchorage means into and out of a locking position, said operating means including a resilient member that is compressed when said anchorage device is in the locking position so that suitable tensioning is obtained.

5. The anchorage device of claim 4, wherein said plate-like support members are adapted to fit between the contour of the vehicle roof and the contour of the vehicle door.

6. The anchorage device of claim 4, wherein said anchorage means are adapted to engage with rivets projecting from the vehicle.

7. The anchorage device of claim 4, wherein said anchorage means are located on the support members.

8. The anchorage device of claim 4, wherein said anchorage means includes an anchorage notch formed in each of the support members for cooperating with a portion of the vehicle, each of said notches having one clamping surface obliquely inclined in relation to the support surfaces at the lower edges of said support members, said notches being movable towards and away from one another when the support members are pivoted.

9. An anchorage device for a load carrier to be mounted on a vehicle roof, comprising:
   load bearing means for extending over the vehicle roof and for carrying a load;
   foot means provided at opposite end portions of the load bearing means for fastening the load bearing means to the vehicle, said foot means including a dorsal surface;
   a guide member rigidly connected to each foot means and disposed substantially parallel to the dorsal surface, portions of the guide member being spaced from the dorsal surface to define a guide space therebetween;
   two plate-like support members pivotally connected to the dorsal surface of each foot means and pivotally guided in the guide space by the dorsal surface and the guide member, the pivotal connections of the support members to the dorsal surface being spaced from one another, said support members each having vehicle abutting support surfaces at their lower edges;
   anchorage means for retaining the foot means on the vehicle; and
   an operating member connected to said support members at locations spaced from their pivotal connections to the dorsal surface for pivoting the support members.

10. The anchorage device of claim 9, wherein the anchorage means includes an anchorage notch formed in each support member for cooperating with a portion of the vehicle, each of said notches having a clamping surface obliquely inclined in relation to said support surfaces, whereby when said support members are pivoted, the support surface are adapted to be clamped against corresponding surfaces on the vehicle.

11. The anchorage device of claim 10, wherein said anchorage notches are cooperable with projections on the vehicle which are in the form of rivets.

12. The anchorage device of claim 10, wherein said anchorage notches are cooperable with projections on the vehicle which are in the form of studs.

13. The anchorage device of claim 9, wherein said plate-like support members are positionable between the contour of the vehicle roof and the contour of the vehicle door.

14. The anchorage device of claim 9, wherein said guide member has an upper edge portion that is bent and that contacts the dorsal surface, thereby spacing the guide member from the dorsal surface to define said guide space, said pivotal connections being in the form of rivets extending through the dorsal surface, through the support members and through the guide member.

15. An anchorage device for a load carrier to be mounted on a vehicle roof, comprising:
 load bearing means for extending over the vehicle roof and for carrying a load;
 foot means provided at opposite end portions of the load bearing means for fastening the load bearing means to the vehicle, said foot means including a dorsal surface;
 a guide member rigidly connected to each foot means and disposed substantially parallel to the dorsal surface, portions of the guide member being spaced from the dorsal surface to define a guide space therebetween, said guide space extending in a crosswise direction in relation to the load bearing means;
 two plate-like support members having upper portions received in said guide space and fastened therein by a pivot, the support members being pivotal in the guide space and being substantially prevented from moving in a direction substantially perpendicular thereto, the pivot fastening one of the support members in the guide space being spaced from the pivot fastening of the other support member in the guide space, said support members having lower portions for extending down into narrow spaces between the vehicle doors and the body of the vehicle, said lower portions being movable in the longitudinal direction of the vehicle and being movable towards and away from one another when said support members are pivoted, said lower portions having support surfaces at their lower edges for being supported on the vehicle; and
 anchorage means cooperable with portions of the vehicle for fastening the lower portions to the vehicle when the support members are pivoted to a locking position.

16. The anchorage device of claim 15, including operating means connected to each pair of support members at a point spaced from said pivots for operating said pair of support members.

17. The anchorage device of claim 16, wherein said anchorage means is cooperable with projections on the vehicle which are in the form of rivets.

18. The anchorage device of claim 16, wherein said anchorage means is cooperable with projections on the vehicle which are in the form of studs.

19. The anchorage device of claim 15, wherein the anchorage means includes one anchorage notch formed in each lower portion for cooperating with said projections, each of said notches having a clamping surface obliquely inclined in relation to said support surfaces so that when said support members are pivoted, the support surfaces thereof are clamped against surfaces on the vehicle.

20. The anchorage device of claim 15, wherein said guide member has an upper edge portion that is bent and that contacts said dorsal surface, thereby spacing said guide member from said dorsal surface to define said guide space, said pivots being rivets which also fasten the guide member to the dorsal surface.

* * * * *